Patented Feb. 7, 1950

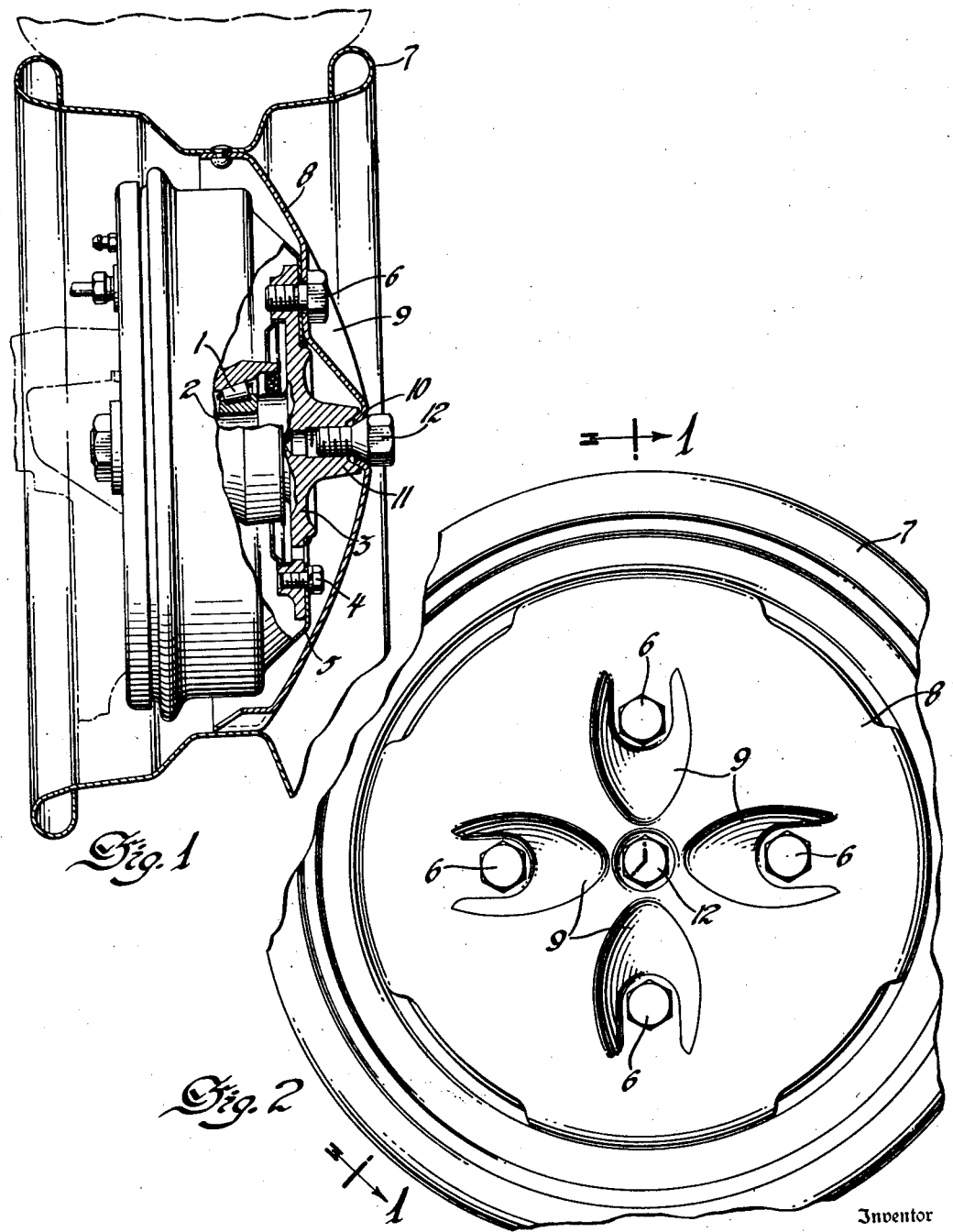

2,497,031

UNITED STATES PATENT OFFICE 2,497,031

VEHICLE WHEEL

Earle S. MacPherson, Detroit, Mich., assignor to General Motors Corporation, Detroit, Mich., a corporation of Delaware Application January 15, 1947, Serial No. 722,113

1 Claim. (Cl. 301—63)

This invention relates to motor vehicle wheel structure which will be relatively simple and inexpensive, will present a clean appearance and will be easy to mount quickly and accurately.

Among other things an aim is to reduce the usual number of parts as well as the weight of the rotating wheel assembly without sacrifice of either good appearance or ample strength. Thus the usual present-day ornamental and costly hub cap, which is largely non-functional except to conceal attachment fittings, can be eliminated acceptably if the central area of the wheel hub is shaped to pleasing design. Furthermore, simple pressings from thin sheet metal properly shaped for increased ruggedness better serve the purpose of a road wheel and are feasible especially for lightweight vehicles using tires of relatively small inside diameter.

A preferred embodiment of the invention is shown in the accompanying drawing wherein Figure 1 is a sectional view on line 1—1 of Figure 2 and Figure 2 is a front elevation of the improved wheel assembly.

In the drawing the numeral 1 indicates an antifriction bearing in which is rotatably mounted the axle or wheel spindle 2 having integral therewith a hub plate or annular flange 3. Near the rim of the flange 3 is a flat circular seating face in a plane normal to the axis of rotation and in a conventional manner it has a number of circumferentially spaced threaded openings to receive fastening studs 4 to clamp thereagainst the web of a brake drum 5. Additional threaded openings in the flange 3 radially outwardly of the axis of rotation provide for reception of removable wheel attachment and driving bolts 6. The number of such bolts in the embodiment illustrated is four but can be varied as desired and it is to be understood that in place of headed attachment bolts there may be used threaded studs carried by the hub plate to be engaged by removable fastening nuts.

The demountable wheel here shown consists merely of two thin metal parts, one being the circular tire rim 7 of the drop center type and the other a disk 8 riveted at its periphery to the rim 7. In general the shape of the disk 8 is that of a hollow spherical segment. As such it can be easily formed and will be capable of withstanding vertical and lateral load. Its dish shape also enables its central region to be fastened over the front face of the mounting hub 3 while positioning the tire rim 7 in vertical alignment with the load supporting bearing 1. Because of the small diameter tire rim the attachment studs 6 engage the disk relatively close to the disk periphery and only a narrow band of the wheel area actually transmits axle load to the pneumatic tire.

With the wheel shaped to resemble a portion of a ball its central region will project laterally beyond the primary wheel attachment studs 6 and to provide flat attachment faces to be clamped by the studs against the flat face of the plate 3 a series of circumferentially spaced and generally radially elongated depressions 9 are pressed into the wheel disk. These sockets, when properly shaped, are in the nature of strengthening formations adding to the inherent sturdiness of the spherical section and furthermore they are enclosing pockets to house the stud heads and are calculated to lessen mechanical unsightliness and to furnish ornamentation to the wheel center. At the exact center of the wheel an opening is pierced therein and the circular margin is pressed or turned inwardly to form an inwardly tapered or frusto-conical flange 10 concentric with the tire rim and this annular flange 10 is seated on a reentrant mating tapered surface on the nose of an outwardly projecting boss 11 integral with the spindle flange 3 and accurately machined for concentricity with the axis of rotation provided by the bearings 1. To hold the tapered flange 10 on its tapered seat there is a correspondingly tapered seating surface on a removable stud 12 axially screw threaded into the boss 11. These interfitting conical formations insure easy and accurate application of the removable wheel by an automatic self-centering action prior to the application of the main attachment studs 6. The wheel assembly is first located on its hub plate by the single central fastening bolt 12 and the tapered seating surfaces compel concentricity of the wheel in its bearing support. Thereafter the additional fastening and driving studs 6 are installed.

I claim:

A vehicle wheel having a tire rim and a central disk in the form of a spherical segment peripherally joined to the medial portion of the tire rim and bulged outwardly therefrom, said disk being formed with a central aperture having a frusto-conical marginal wall extending inwardly of the spherical segment, a wheel supporting hub structure including an intermediate peripheral flange portion having detachable fastening connection with the disk at least half way from the axis to the periphery of the disk and two axial portions extending oppositely from the intermediate portion, a brake drum secured to the hub intermediate portion and entirely housed within and disposed close to the tire rim, one hub axial portion constituting an axle spindle rotatable in a bearing disposed in the brake drum and the second hub axial portion having in its outer end a frusto-conical depression in which the frusto-conical wall of the disk central aperture is seated to center the disk on the hub structure, and a central bolt extending through the disk central aperture into the hub structure and having a tapered head clamping the frusto-conical wall of the disk central aperture to the frusto-conical depression of the second hub axial portion.

EARLE S. MACPHERSON.

REFERENCES CITED

The following references are of record in the file of this patent:

UNITED STATES PATENTS

| Number | Name | Date |
| --- | --- | --- |
| 1,341,465 | Hoffman | May 25, 1920 |
| 1,675,630 | Ash | July 3, 1928 |
| 2,283,860 | Manning | May 19, 1942 |

FOREIGN PATENTS

| Number | Country | Date |
| --- | --- | --- |
| 170,740 | Great Britain | 1921 |
| 223,891 | Great Britain | 1924 |